(12) United States Patent
Cai et al.

(10) Patent No.: US 10,308,157 B2
(45) Date of Patent: Jun. 4, 2019

(54) TRUCK CYCLE SEGMENTATION MONITORING SYSTEM AND METHOD

(71) Applicant: Caterpillar Inc., Peoria, IL (US)

(72) Inventors: Zhijun Cai, Dunlap, IL (US); Bradley Bomer, Pekin, IL (US); Shane C. McBride, Denver, CO (US); Eric Durand, Gradignan (FR); Anders Thomsen, Dubai (AE)

(73) Assignee: Caterpillar Inc., Deerfield, IL (US)

( * ) Notice: Subject to any disclaimer, the term of this patent is extended or adjusted under 35 U.S.C. 154(b) by 227 days.

(21) Appl. No.: 15/253,364

(22) Filed: Aug. 31, 2016

(65) Prior Publication Data

US 2018/0056839 A1    Mar. 1, 2018

(51) Int. Cl.
*B60P 1/04* (2006.01)
*G07C 5/08* (2006.01)
*G06Q 10/06* (2012.01)

(52) U.S. Cl.
CPC ............ *B60P 1/04* (2013.01); *G06Q 10/0639* (2013.01); *G07C 5/0841* (2013.01); *G07C 5/0816* (2013.01)

(58) Field of Classification Search
CPC ..... B60P 1/04; G06Q 10/0639; G07C 5/0841; G07C 5/0816
USPC ........................................................ 701/33.4
See application file for complete search history.

(56) References Cited

U.S. PATENT DOCUMENTS

| 5,602,761 A | 2/1997 | Spoerre et al. |
| 9,302,859 B2 | 4/2016 | Vesterdal et al. |
| 2006/0245896 A1* | 11/2006 | Alshaer ............... E02F 3/434 414/685 |
| 2010/0198466 A1* | 8/2010 | Eklund ................ E02F 9/26 701/50 |
| 2011/0231169 A1 | 9/2011 | Furem et al. |
| 2012/0330500 A1* | 12/2012 | Kamada .............. E02F 9/2285 701/33.4 |
| 2013/0000289 A1* | 1/2013 | Zhang ................. F15B 1/02 60/327 |
| 2013/0205733 A1* | 8/2013 | Peters ............... A01D 41/127 56/10.1 |
| 2014/0052349 A1* | 2/2014 | Tsukane .............. E02F 9/267 701/50 |

(Continued)

FOREIGN PATENT DOCUMENTS

| EP | 0913528 A2 * | 5/1999 | ............ E02F 3/3408 |
| JP | 2004097055 A * | 4/2004 | |
| KR | 20100086908 A * | 8/2010 | |

*Primary Examiner* — Tuan C To
(74) *Attorney, Agent, or Firm* — Leydig, Voit & Mayer, Ltd.

(57) ABSTRACT

A machine having a work implement includes a sensor connected to the work implement, the sensor providing a signal indicative of a change in acceleration of the work implement. A cycle controller associated with the sensor, the cycle controller disposed to receive the signal and operating to monitor the signal. The cycle controller is programmed and operates to analyze the signal to determine at least a presence and a duration of a change in acceleration of the work implement of the machine with respect to time, compile an actual time trace of the change in acceleration of the work implement, compare the actual time trace with a predefined time trace that represents a work cycle segment, and catalog presence and duration of a work cycle segment when the actual time trace is consistent with the predefined time trace.

7 Claims, 8 Drawing Sheets

(56) References Cited

U.S. PATENT DOCUMENTS

| | | | |
|---|---|---|---|
| 2014/0067289 A1 | 3/2014 | Baldwin | |
| 2014/0237868 A1* | 8/2014 | Whitchurch | E02F 3/651 37/413 |
| 2014/0244101 A1* | 8/2014 | Chitty | E02F 9/2054 701/31.6 |
| 2014/0288768 A1* | 9/2014 | Fujiwara | E02F 9/226 701/33.4 |
| 2014/0324277 A1* | 10/2014 | Urasawa | G07C 5/008 701/31.5 |
| 2014/0336883 A1* | 11/2014 | Thompson | B60P 1/045 701/50 |
| 2016/0001411 A1* | 1/2016 | Alberti | B25B 23/14 700/188 |
| 2016/0076223 A1* | 3/2016 | Wei | E02F 9/2029 701/50 |
| 2016/0236689 A1* | 8/2016 | Pettersson | B60W 40/06 |
| 2017/0198809 A1* | 7/2017 | Omran | B60K 25/06 |

\* cited by examiner

TRUCK CYCLE SEGMENTATION MONITORING SYSTEM AND METHOD

TECHNICAL FIELD

The present disclosure relates generally to work trucks and, more particularly, to a system and method for determining and monitoring service cycles for work trucks.

BACKGROUND

Certain types of work machines such as off-highway trucks, which are used to haul material at construction and/or mining sites, will typically operate continuously and perform repetitive tasks, for example, loading, hauling, dumping, and return tasks between particular locations on a jobsite or mine. Using existing technology, a site manager can monitor work progress at a jobsite on a large scale by tracking the location of the various trucks and the amount of material being hauled. In this way, the operator or customer can track performance of their truck fleets and infer production/productivity, work progress, fleet management and the like.

However, there are currently no existing performance monitor systems for off highway trucks. In other words, there is no information on the particular performance parameters and efficiencies associated with the operation of each truck. For example, U.S. Patent Application Publication No. 2011/0231169 A1 (the '169 publication) describes a system in which various sensors are mounted onto a mining shovel for monitoring and predicting machine performance, predicting a failure related to the machine, predicting a failure related to a mechanical machine component, and/or predicting a failure related an electrical machine component. The system described in the '169 publication, however, is complex and costly, and does not readily provide information on the operating efficiency of the particular mining shovel.

SUMMARY

In one aspect, the disclosure describes a machine having a work implement. The machine includes a frame, an engine associated with the frame, ground engaging members connected with the frame and associated with the engine, the ground engaging members allowing the frame to travel along a ground surface, and a work implement connected to the frame. A sensor is connected to the work implement. The sensor provides a signal indicative of a change in acceleration of the work implement and the frame when the machine is moving or working. A cycle controller is associated with the sensor and disposed to receive the signal. The cycle controller operates to monitor the signal. The cycle controller is programmed and operates to: analyze the signal to determine at least a presence and a duration of a change in acceleration of the work implement of the machine with respect to time, compile an actual time trace of the change in acceleration of the work implement, compare the actual time trace with a predefined time trace that represents a work cycle segment, and catalog presence and duration of a work cycle segment when the actual time trace is consistent with the predefined time trace.

In another aspect, the disclosure describes an off-highway truck having a bed for hauling material. The off-highway truck includes a frame, an engine associated with the frame, and ground engaging members connected with the frame and associated with the engine, the ground engaging members allowing the frame to travel along a ground surface. A sensor is connected to the bed. The sensor provides a signal indicative of a change in acceleration of the bed and the frame. A cycle controller is associated with the sensor. The cycle controller is disposed to receive the signal and operates to monitor the signal. The cycle controller is programmed to analyze the signal to determine at least a presence and a duration of a change in acceleration of the bed with respect to time, determine that the truck has performed a dumping operation when the signal indicates that the bed has had an increasing acceleration when pivoted towards a dumping position, followed by a decreasing acceleration when pivoted down towards a travel position, and catalog a presence and duration of the dumping operation.

In yet another aspect, the disclosure describes a method for operating a machine having a work implement. The method includes operating the machine and the work implement to perform a work cycle, the work cycle comprising a plurality of work cycle segments including a loading segment, a hauling segment, a dumping segment and a return segment. The method further includes operating an accelerometer associated with the work implement and providing a signal indicative of an acceleration of the work implement in real time to a cycle controller. The method also includes using the cycle controller to analyze the signal and determine, at least in part, a change in orientation or a vibration presence and duration, using the cycle controller to compile an actual time trace based on the signal, using the cycle controller to compare the actual time trace with a plurality of predefined time traces, each of the plurality of predefined time traces corresponding to a particular one of the plurality of work cycle segments, and using the controller to determine which of the plurality of work cycle segments is present in a particular period of machine operation based on a result of the comparison.

DETAILED DESCRIPTION

The present disclosure relates to a system and method for inferring and monitoring machine performance. In the described, exemplary embodiment, the work cycle of an off-highway truck is segmented and analyzed based on information provided by a sensor such as an acceleration sensor mounted on a truck bed, but the principles in accordance with the disclosure are applicable to any machine that may perform repetitive cycles and having a work implement that is subject to repetitive stresses during operation.

Figure 1:
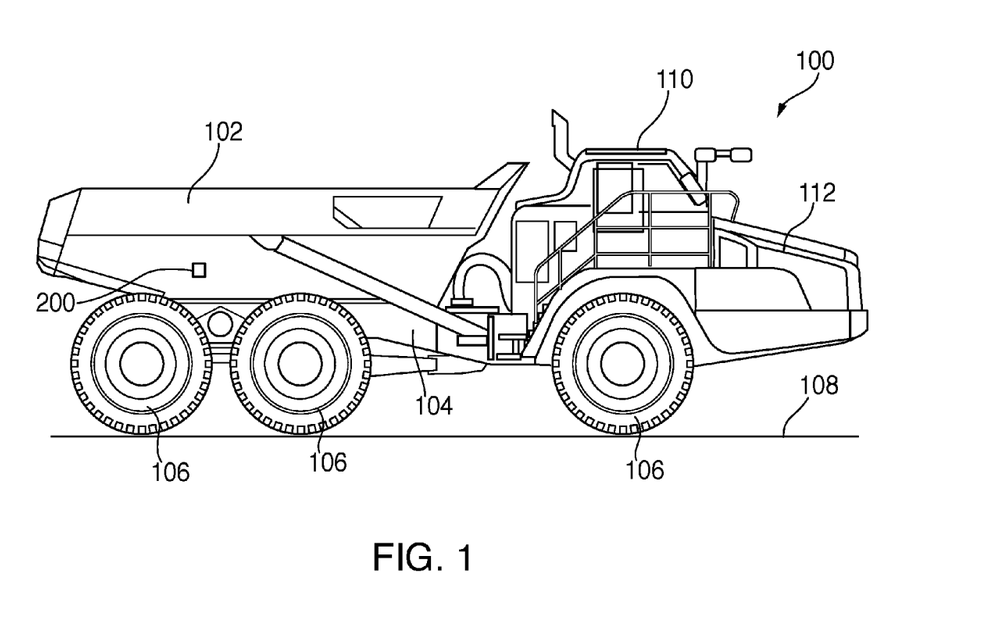
FIG. 1 is a schematic view of an off-highway truck in accordance with the disclosure.

FIG. 1 illustrates a machine 100, which is embodied as an off-highway truck, in accordance with the disclosure. The machine 100 includes a work implement 102, embodied as a truck bed, which is pivotally connected to a frame 104. During operation, the machine 100 travels between a loading location, where material is loaded into the bed 102, to a dumping location, where the material is off-loaded from the bed, and then returns to the loading location to repeat the process. In the typical configuration illustrated in FIG. 1, the machine 100 includes ground-engaging members or wheels 106 that allow the frame 104 to travel along a ground surface 108. The machine 100 further includes an operator cab 110 and an engine 112.

In the illustrated embodiment, the machine 100 includes at least one accelerometer sensor 200. The sensor 200 is connected or otherwise associated with the bed 102 of the machine 100 such that vibrations or changes in direction of the machine bed during travel over rough terrain, and also vibration imparted onto the bed during a loading or unloading operation, are sensed by the sensor 200 and cause the sensor to provide a signal, which can be processed to infer various operating cycles of the machine. Each operating cycle may include various operating segments representing various machine operations that make up a cycle. For example, a transport cycle may include a loading segment, a hauling segment, and a dumping segment. Additional segments such as segments when the machine is stopped while loaded, or unloaded, may also be presented and tracked. In general, the various work segments of the machine are identified by events such as when the machine is moving or stopped, which indication can be given to a controller from a location or global positioning system (GPS) signal, a machine ground speed sensor, and the like. Additional events may include the position of the truck bed or, in general, a work implement position, and the like. It is noted that while in FIG. 1 the position of the sensor 200 is shown on the side wall of the bed, it should be appreciated that the sensor 200 can be located at any location along the bed and, in one embodiment, can be placed below the floor of the bed to protect the sensor from flying debris and the environment during service. In general, the sensor 200 can be associated with a work implement in any appropriate fashion.

Figure 2:
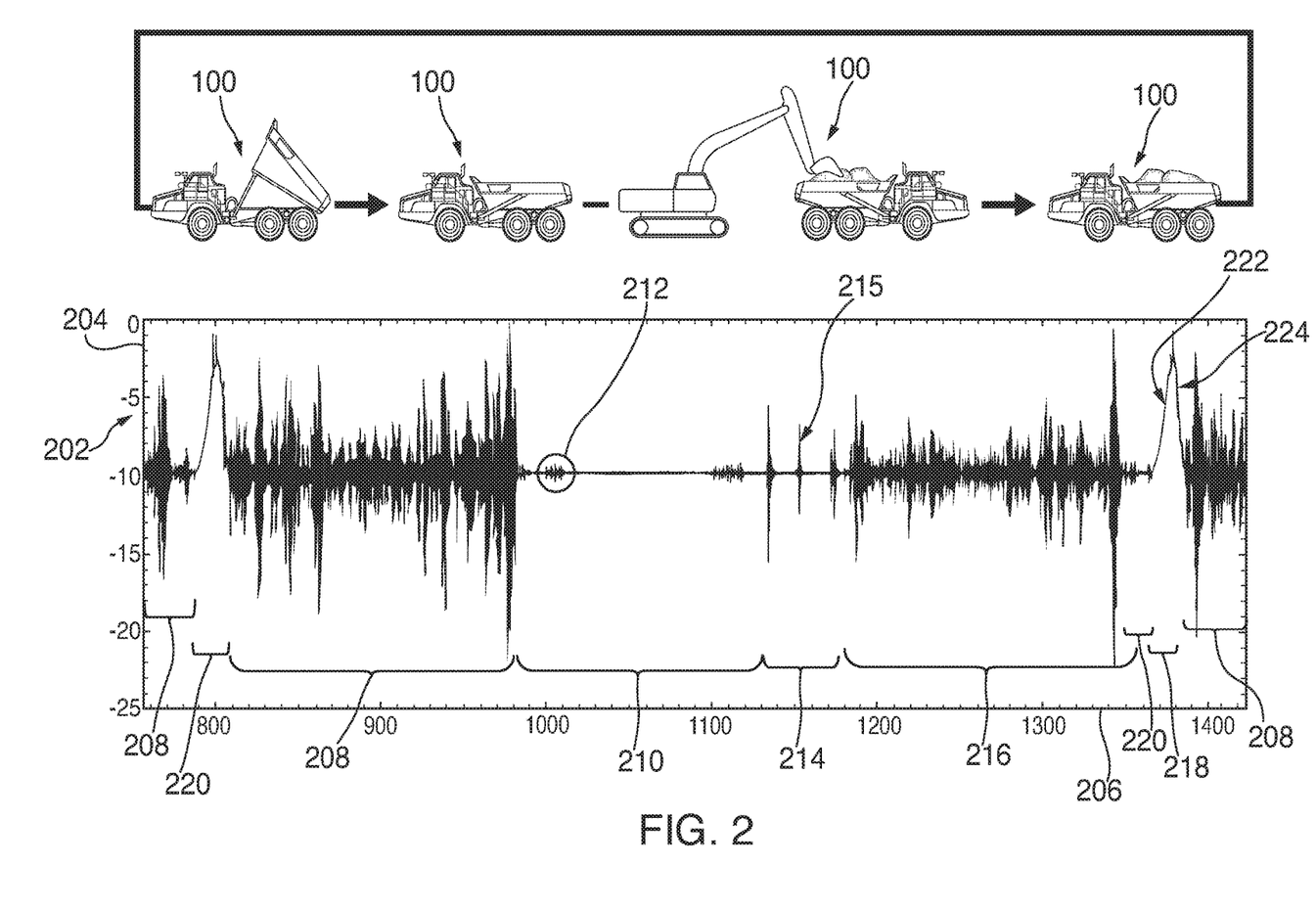
FIG. 2 is an exemplary time trace in accordance with the disclosure.

A sample time trace of signals from the sensor 200 are shown in FIG. 2, and are plotted for a representative cycle of the machine 100. In this context, a machine cycle can be defined as a collection of working segments of the machine as the machine operates at a site. The cycle can be initiated at any time when the machine is at a particular location, for example, before it begins travelling towards a loading location, and the cycle may be completed when the machine resumes the same position. In FIG. 2, the magnitude of a vertical acceleration 202 of the bed 102 of the machine 100 is plotted along the vertical axis 204 over time, which is plotted along the horizontal axis 206. As can be seen from the time trace of FIG. 2, the vertical acceleration 202 of the bed 102 exhibits different behavior that can help discern the different operating segments of an operating cycle of the machine. These various segments are identified and described below.

More particularly, in a first or return segment 208, the machine 100 may travel with the bed empty or unloaded towards a loading location. During the first segment 208, the relatively low, unloaded mass of the machine may cause vibration as the machine travels over rough terrain at the jobsite. This vibration will have vertical acceleration components, as shown in the graph, having peaks that are relatively high due to the stiff suspension system of the machine. When the machine reaches its loading location, it may stop and wait in queue behind other machines waiting to be loaded. In a second or waiting segment 210, therefore, the vertical acceleration is at about zero while the machine is stopped, and exhibits small vibrations, indicated generally as 212, as the machine changes position in the queue towards a loading position. In the exemplary trace shown, there are two moves of the machine during the waiting segment 210. As can be appreciated, the second or waiting segment 210 may not appear if no other machines are waiting in queue to be loaded and the machine 100 pulls directly up to the loading position.

When the machine 100 reaches the loading position, a third or loading segment 214 appears on the trace of vertical acceleration 202. During the loading segment 214, large and distinct groupings of vibration 215, each of which represents the dropping of a bucket load of material into the bed, can be observed. In the exemplary trace shown, three buckets of material are loaded into the bed. After the machine has been sufficiently loaded, it begins travelling towards a dumping site during a fourth or loaded travel segment 216. The vertical acceleration 202 signal during the loaded travel segment 216 appears similar to that of the return segment 208 because the machine travels over rough terrain, but the magnitude of the vibration or acceleration peaks during travel are muted when the machine is loaded because of the increased overall mass of the loaded machine relative to the unloaded machine.

Once the machine arrives at the dumping location, it may wait once again for a short period 218 for a dumping location before undertaking a dumping operation over a fifth or dumping segment 220. During the dumping segment 220 the bed is raised to allow the material to flow from the back of the bed, and is then lowered again. The dumping operation produces a bell-shaped curve in the vertical acceleration 202 that includes an increasing leg 222 while the bed is raised and a decreasing leg 224 as the bed is lowered. The series of segments repeats after the unloading operation is complete as the machine travels during an additional first segment in an unloaded condition towards the loading location.

The signals underlying the time trace shown for illustration in FIG. 2 are provided to a controller, which is programmed to and operates to analyze the signals and automatically discern and catalog various operating parameters of the machine 100 according to the frequency, severity and duration of each operating segment to infer or estimate various efficiency parameters for the particular machine. This information, and/or the conclusions and data generated by the analysis, can be processed by a local controller that is mounted on and operates on the machine, or a remote controller that is in informational association or connection with the machine and the sensor 200.

Figures 3, 4:
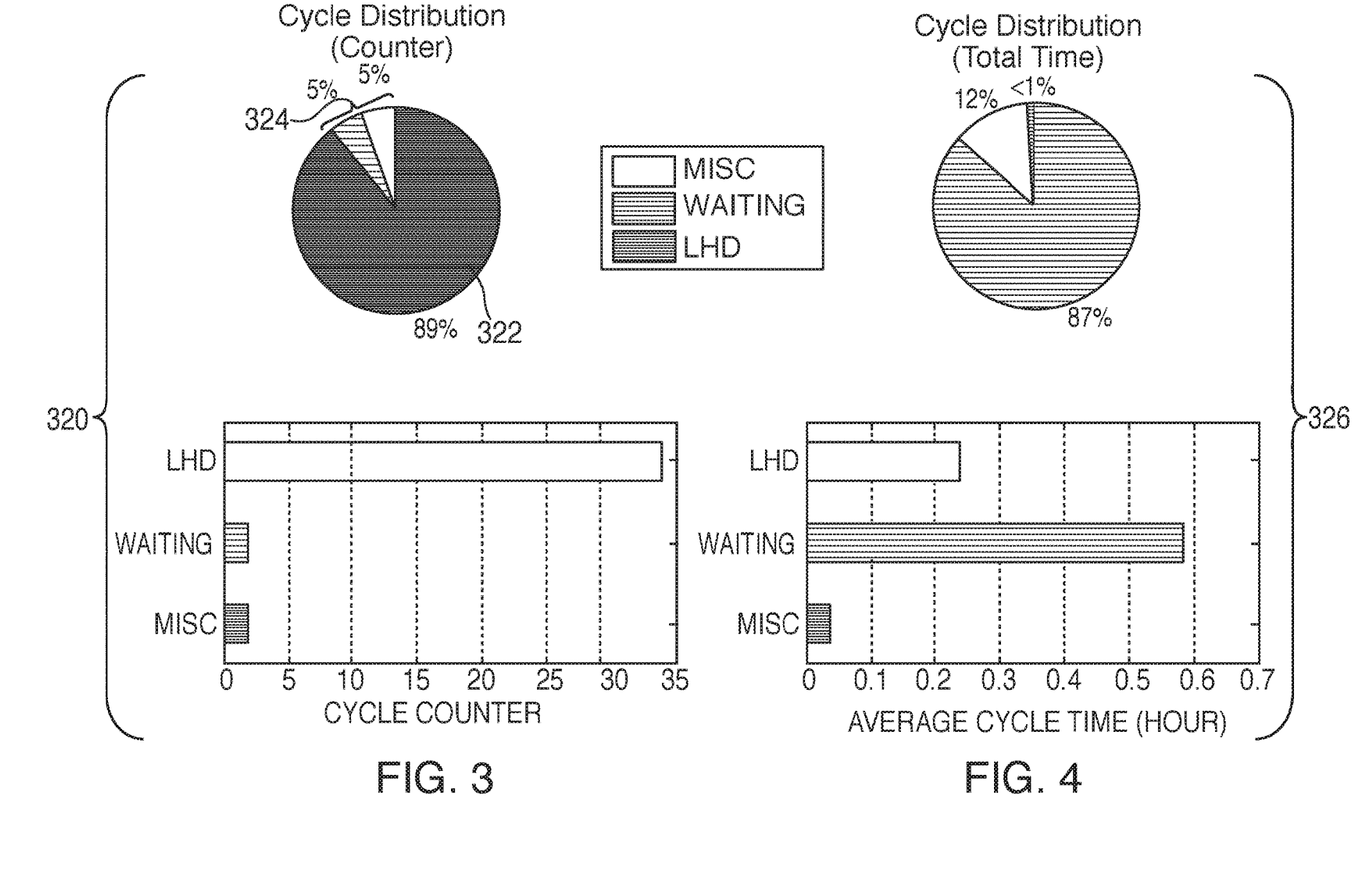
FIGS. 3 and 4 are exemplary truck performance graphs in accordance with the disclosure.

Various parameters and metrics of machine operation can be inferred, estimated or calculated on the basis of the vertical acceleration signal provided by the sensor 200 for a particular machine. For example, as shown in the charts 320 of FIG. 3, a controller may count the number of cycles during which the machine is working in a productive fashion including loading, hauling and dumping (LHD) cycles, and also non-productive segments such as waiting stopped or performing miscellaneous tasks. The counting of productive cycles 322 and non-productive segments 324, in the aggregate, can provide an indication of utilization of the machine for efficiency determinations. In the charts of FIG. 3, for example, 89% of the cycles executed by the machine are productive. This information can be used to modify the machine's schedule or to adjust the number of machines operating at a jobsite to increase overall efficiency of the work operation by the operator of the site.

Figure 5A:
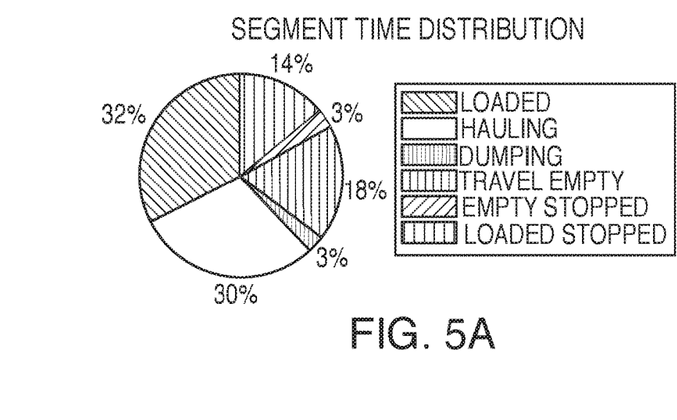
FIGS. 5A-5C and 6A-6C are additional truck performance graphs in accordance with the disclosure.
Figure 5B:
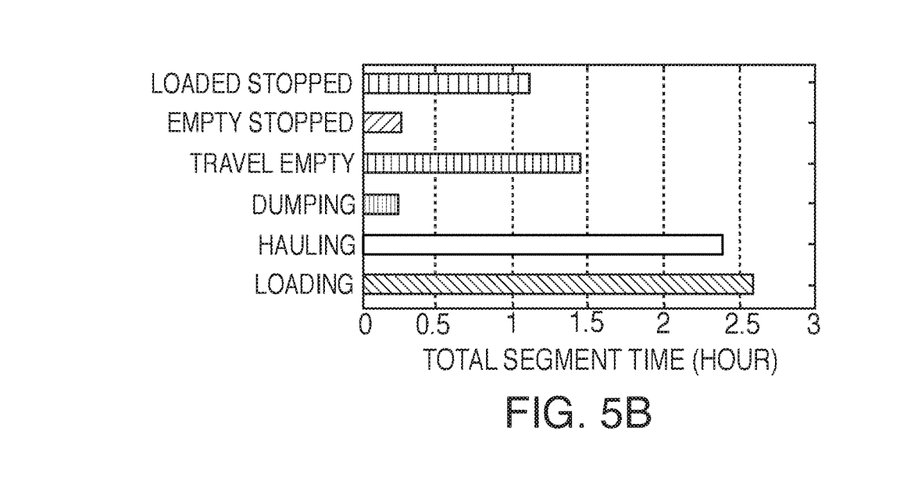
Figure 5C:
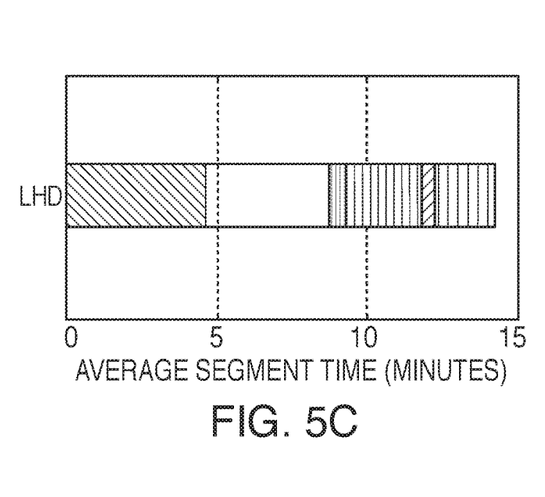

In another example, the total productive utilization of the machine with respect to time lapsed can also be calculated. As shown in the graphs 326 of FIG. 4, the average cycle time for various cycles is measured, In this fashion, the truck spends an average of between 0.5 and 0.6 hours waiting, which represents 12% of the truck's up-time, with the remaining time being spent in LHD cycles and miscellaneous tasks. In general, the controller can calculate a time distribution for the various cycle types, as shown in FIG. 5A, a total segment time for each cycle or segment type, as shown in FIG. 5B, and also the average segment time for each segment type, as shown in FIG. 5C.

Figure 6A:
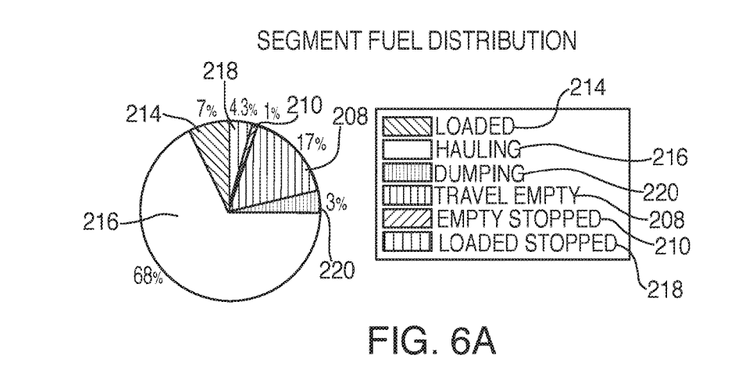
Figure 6B:
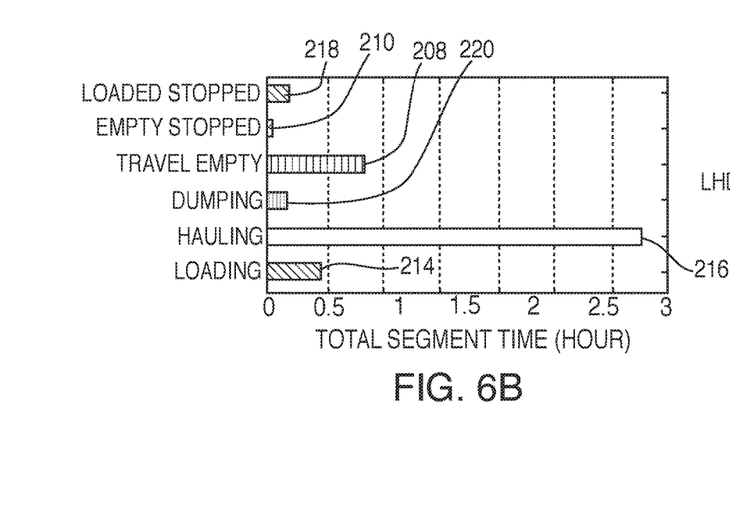
Figure 6C:
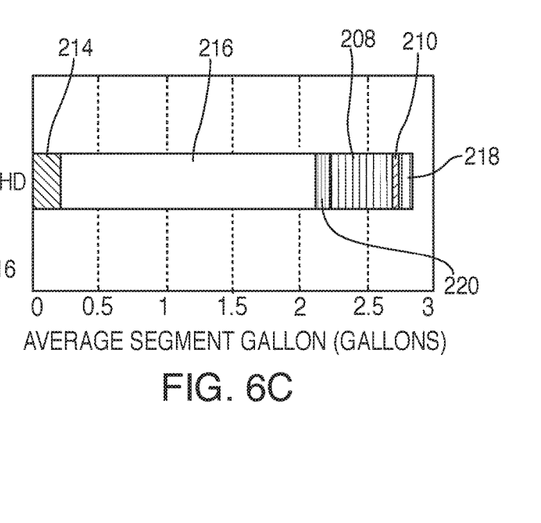
Figure 7:
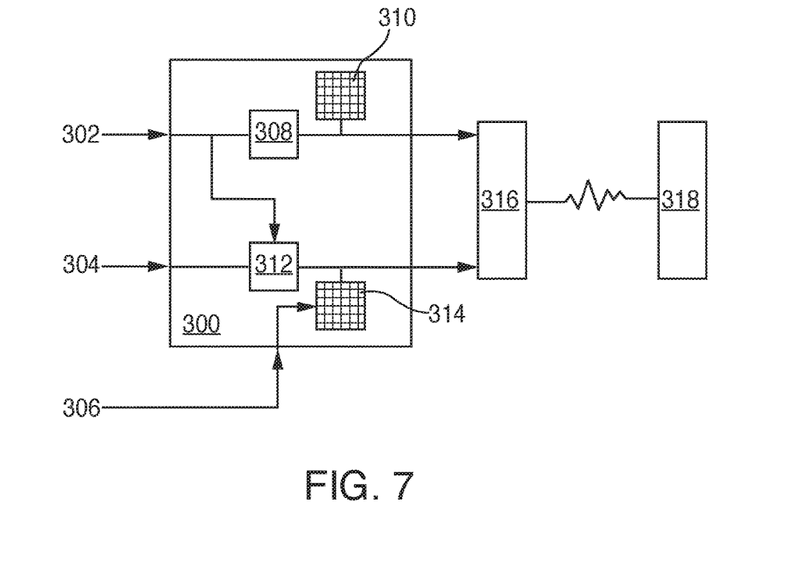
FIG. 7 is a block diagram of a controller in accordance with the disclosure.

Additionally, the segment information can be cross-referenced in the controller with other machine operating parameters such as fuel consumption. In the illustrated embodiment, the controller that communicates with the sensor 200 is further configured to receive information indicative of the commanded or actual fuel consumption of the machine in real time. This fuelling information can be cross-referenced with the segment information based on the sensor signal to create an array of data that can be used on estimate or calculate the overall fuel consumption of the machine during each segment. This referenced information can then be used by the site or machine operator to not only schedule refueling of the machine during a non-work segment, but it can also be used to optimize fuel usage at the site to reduce overall costs for the site operator. An exemplary pie chart showing fuel consumption distribution for a sample machine run is shown in FIG. 6A, and bar charts showing total fuel consumption for various segments in accordance with the disclosure are shown in FIGS. 6B and 6C A block diagram for a cycle controller 300 in accordance with the disclosure is shown in FIG. 7. In this embodiment, the various software executable functions of the controller 300 that are described may be implemented in software that is coded into and executing in a programmable logic electronic controller. The electronic controller may be a single controller or may include more than one controller disposed to control various functions and/or features of the machine 100. For example, a master controller, used to control the overall operation and function of the machine, may be cooperatively implemented with a controller that is connected to the sensor 200 and operating to evaluate and estimate or calculate the cycle and segment information and related parameters discussed above. In this embodiment, the term "controller" is meant to include one, two, or more controllers that may be associated with the machine 100 and that may cooperate in controlling various functions and operations of the machine 100 (FIG. 1). The functionality of the controller, while shown conceptually in FIG. 7 to include various discrete functions for illustrative purposes only, may be implemented in hardware and/or software without regard to the discrete functionality shown. Accordingly, various interfaces of the controller are described relative to components of the cycle and/or segment analysis system shown in the block diagram of FIG. 7 are not intended to limit the type and number of components that are connected, nor the number of controllers that are described.

As shown in FIG. 7, the controller 300 receives an acceleration signal 302 as a first input. The acceleration signal 302, which in the illustrated embodiment is provided by the sensor 200 (FIG. 1) is indicative of the acceleration of the truck bed in real time, and has sufficient resolution to discern vibrations caused on the bed and changes in orientation of the bed during operation of the machine. An additional input indicative of the instantaneous commanded or actual fuel consumption 304 is also provided to the controller 300, for example, by an engine controller. Additional, optional inputs 306 are shown provided to the controller 300. The optional inputs 306 may include signals indicative of machine operating parameters such as ground speed, inclination of the ground with respect to horizontal or vertical, operating mode of the machine (normal, service, testing and the like), time of day, geographical location of the machine based on a global positioning system (GPS) or a local positioning system at a given site, an indication of whether the truck bed is raised or lowered, and the like. These and similar optional signals may be used by the controller to refine the data and information collected for the machine.

At a basic level, the controller 300 provides the acceleration signal to a cycle analyzer function 308. The analyzer function 308 operates to first filter and analyze the signal 302 to determine a vibration presence and frequency, for example, using a fast Fourier transform or similar operation, and to record the same with respect to time to create a time trace. This information may then be used to identify a work segment of truck, which is put into context and compared to a normal work cycle of the truck. For example, a dumping segment is typically expected to follow a loading segment and a hauling segment. That time trace is then compared to known or learned time traces to determine a match with a predefined trace. In an alternative embodiment, the controller looks for events before transitioning from one segment in a known series of segments in a work cycle to the next segment. Once a match has been established, the acquired time trace is classified as representing a particular cycle, as described above, and the information is stored in a database 310.

In a similar fashion, the signal 302 along with the fuel consumption 304 are provided to a fuel analyzer function 312, which calculates or estimates fuel consumption of the machine during the various segments or cycles. The information is stored in a database 314, which may also include further information cataloged in real time based on the optional signals 306. At its output, the controller 300 can relay information from the analyzer function 308 and/or the fuel analyzer function 312 to a transmitter 316, which can wirelessly transmit this information to a remote location or server 318 for logging and further processing by a site operator.

INDUSTRIAL APPLICABILITY

Figure 8:
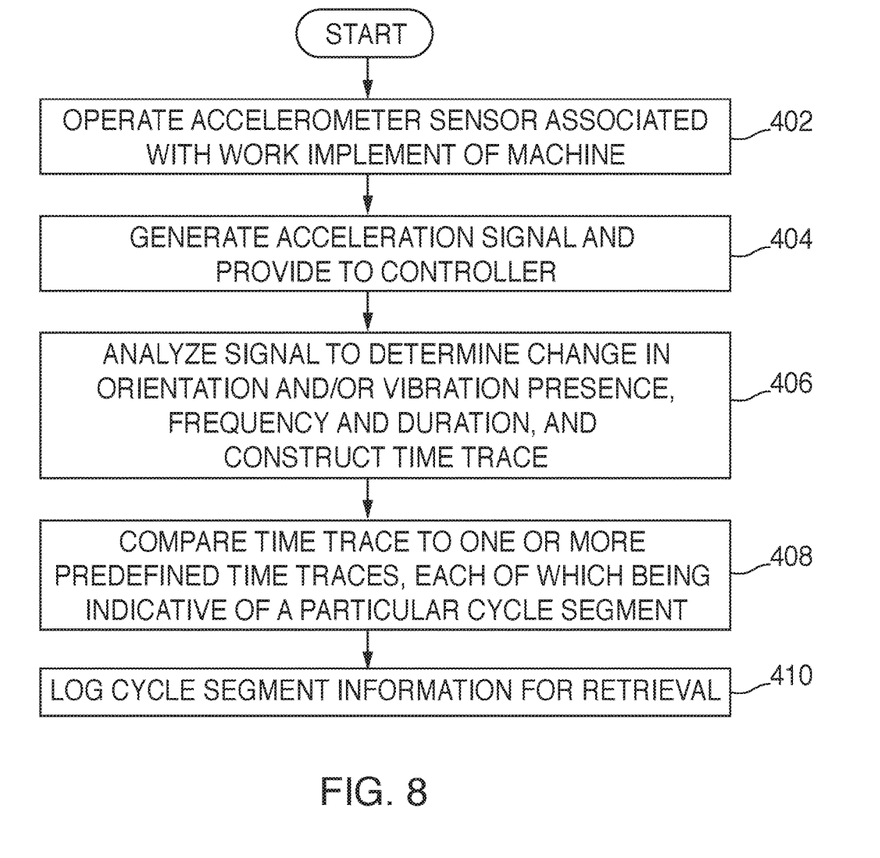
FIG. 8 is a flowchart for a method in accordance with the disclosure.

The present disclosure is applicable to various types of work machines, in addition to an off-highway truck, as described herein. A flowchart for a method of operating a machine at a jobsite is shown in FIG. 8. The process includes operating an accelerometer sensor, which is connected to a work implement of a machine, at 402. The accelerometer sensor may generate a vertical acceleration signal, in real time, which signal is indicative of a vertical acceleration of the work implement, and provide the signal to a controller at 404. In one embodiment, the vertical acceleration may be appropriate to infer the work cycle of a truck but, in different embodiments, an acceleration along a different axis may be appropriate.

The controller receiving the acceleration signal may filter and analyze the signal to determine changes in orientation and or vibration presence, frequency and duration to construct a time trace array at 406. The controller then compares the time trace, in real time, with one or more predefined time traces, each of which is indicative of a particular segment at 408. For example, as shown in FIG. 2, predefined segments may include loading, unloading, travelling loaded or empty, waiting loaded or unloaded, and the like. Information on the presence, duration and, optionally, severity of the various segments is logged in the controller or at another location for retrieval and review by a machine or site operator at 410, who can also use the segment information to infer the time, duration, severity and number of work cycles of the truck.

Figure 9:
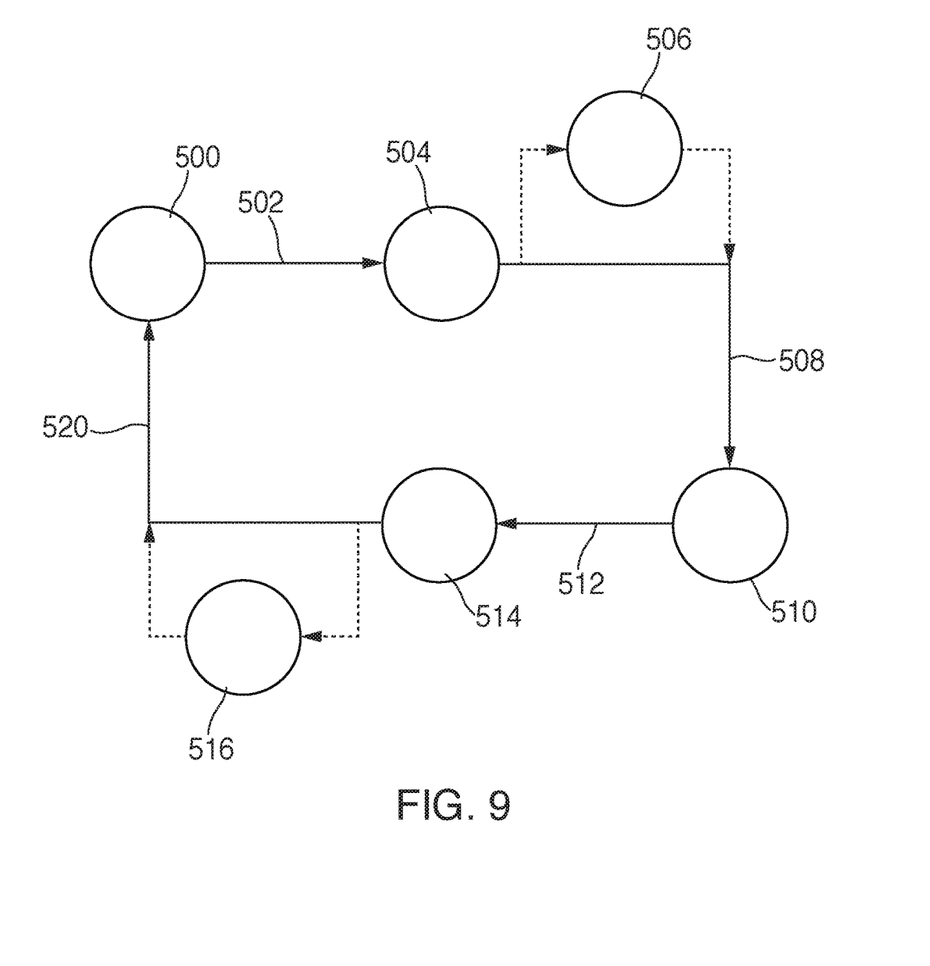
FIG. 9 is a state-flow diagram in accordance with the disclosure.

A state flow diagram that a controller may operate under, which includes work segments and transitioning events, is shown in FIG. 9. It should be appreciated that the illustrated state flow diagram may be embodied in non-transitory, computer executable instructions operating within a programmable logic controller, and is shown here as a state flow diagram for sake of discussion. In this figure, various operating segments of a truck, and also various events that the controller may use to discern transition from one work segment to another are shown. In reference to FIG. 9, a work cycle may initiate at a loading segment 500. As previously described, the loading segment 500 may be established when discrete vibrations are sensed by an acceleration or vibration sensor, for example, the sensor 200 (FIG. 1).

The controller may continue tracking the loading segment 500 until an event signifies a transition to the next segment. In the illustrated diagram, a loading completion transition 502 will be established when an event such as completion of machine loading based on the number of loads deposited into the bed, for example, three, has been reached, when the machine starts moving, as indicated by the machine's location or speed, and while the truck bed remains in the lowered position, is sensed. In the normal or expected series of work operations, the controller will begin tracking a hauling segment 504 while the machine is moving following a loading operation. During the hauling segment 504, the controller may track a continuous vibration while the machine is moving. Optionally, a loaded-stopped segment 506 may also be recorded during the hauling segment if the machine speed or change in location indicates that the machine stopped.

The hauling segment 504 will generally remain active in the controller until a transition event 508 indicates that the machine has transitioned into a dumping operation. In the illustrated embodiment, the dumping segment 510 will be initiated after the hauling segment when the controller senses or otherwise establishes that the inclination or position of the bed has changed and, specifically, that the truck bed is being raised during the transition event 508.

The controller will remain in the dumping segment 510 until an event signifies that the dumping operation has been completed. In the embodiment illustrated, the controller will transition from the dumping segment 510 to a travel-empty segment 514 upon occurrence of a transition event 512, which can include an indication that the machine is once again moving and/or that the truck bed has been lowered from the raised position. While in the travel-empty segment 514, the controller may monitor a continuous vibration in conjunction with a changing machine position on the site and/or a machine ground-travel speed. During the travel-empty segment 514, the controller may monitor for temporary machine stoppages on the basis of machine speed or changing location, and log an empty-stopped 516 segment duration, which is optional.

The controller will remain in the travel-empty segment 514 until events during a transition 520 indicate that the next segment, which is again a subsequent loading segment 500 is manifested. In the illustrated embodiment, events such as the truck bed being or staying in the lowered position, a stopping of the machine for loading, and isolated vibrations indicating loads being deposited into the bed, are monitored and, when sensed, initiate the loading segment 500 and terminate the travel-empty segment 514. When a subsequent loading segment 500 is sensed, the controller may log information on a complete work cycle, which started upon initiation of the last loading segment 500, for later access and/or retrieval by a site operator, and repeat the entire cycle as described above.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

We claim:

1. An off-highway truck having a bed for hauling material, comprising:
   a frame;
   an engine associated with the frame;
   ground engaging members connected with the frame and associated with the engine, the ground engaging members allowing the frame to travel along a ground surface;
   a sensor connected to the bed, the sensor providing a signal indicative of a change in acceleration of the bed and the frame; and
   a cycle controller associated with the sensor, the cycle controller disposed to receive the signal and operating to monitor the signal;
   wherein the cycle controller is programmed and operates to:
      analyze the signal to determine at least a presence and a duration of a change in acceleration of the bed with respect to time;
      determine that the truck has performed a dumping operation when the signal indicates that the bed has had an increasing acceleration when pivoted towards a dumping position, followed by a decreasing acceleration when pivoted down towards a travel position;
      catalog a presence and duration of the dumping operation; and
      analyze the signal to determine whether discrete periods of vibration are present at the bed while the bed is in a lowered position and following a dumping segment and, when discrete periods of vibration are present when there is otherwise little to no vibration, determine that the bed is being loaded with material and catalog a pressure and duration of a loading segment.

2. The off-highway truck of claim 1, wherein the cycle controller is further programmed and operates to analyze the signal to determine whether continued vibration is present at the bed and, when continued vibration is present, determine that the truck is travelling along a rough ground surface and catalog a presence and duration of a travel segment.

3. The off-highway truck of claim 2, wherein the cycle controller is further programmed and operates to determine a peak vibration amplitude to determine whether the truck is travelling in a loaded or unloaded condition, and to catalog a presence and duration of loaded travel cycle segment or an unloaded travel segment.

4. The off-highway truck of claim 1, wherein the cycle controller is further programmed and operates to analyze the signal to determine an absence of acceleration of the bed and, when no acceleration is present, determine that the truck is in a stopped segment.

5. The off-highway truck of claim 1, wherein the sensor is an acceleration sensor connected to a bottom portion of the bed, and wherein the signal is indicative of a vertical acceleration of the bed.

6. The off-highway truck of claim 1, further comprising an engine controller providing a fueling signal to the cycle controller, the fueling signal being indicative of a fuel consumption of the machine in real time.

7. The off-highway truck of claim 6, wherein the cycle controller is further programmed to and operates to correlate a fuel consumption of the machine with the presence and duration of the change in acceleration of the bed based on the fueling signal, and to record a total fuel consumption of the machine during operation in a work segment.

* * * * *